United States Patent Office 3,449,732

Patented June 10, 1969

3,449,732

WOVEN INFORMATION-STORAGE MATRIX

Hisao Maeda and Akira Matsushita, Ota-ku, Tokyo-to, Japan, assignors to Toko Kabushiki Kaisha, Tokyo-to, Japan, a joint-stock company of Japan Continuation of application Ser. No. 309,530, Sept. 17, 1963. This application Sept. 1, 1967, Ser. No. 665,186

Claims priority, application Japan, Sept. 21, 1962, 37/41,507; Oct. 11, 1962, 37/45,144

Int. Cl. G11b *15/00*

U.S. Cl. 340—174 5 Claims

ABSTRACT OF THE DISCLOSURE

An information-storage matrix having a woven structure of orthogonally intersecting arrays of warp and weft conductors. The weft conductors are straight, stiff, solid in cross section and arranged in parallel. A ferromagnetic information-retentive circumferential film without discontinuities extends axially on each weft conductor. A plurality of pairs of flexible warp conductors effectively define coil turns on each of the non-magnetic conductors associated with respective bit-storage zones on the film of the non-magnetic conductors. Spacers between adjacent pairs of flexible conductors are effective to cause each effective coil turn to lie close adjacent to its respective bit-storage zone.

This is a continuation of our application Ser. No. 309,530 filed Sept. 17, 1963 and abandoned.

The present invention relates to magnetic memory devices for use in electronic computers, automatic electric control devices and the like, and more particularly to matrix-type magnetic memory devices in which a plurality of wires having magnetic layer thereon, each of said wires being prepared by coating a ferro-magnetic thin film such as permalloy film on an electrically conductive core wire (this wire will be denoted hereinafter merely as magnetic wire), and a plurality of other conventional conductive wires are woven in orthogonally intersecting relationship.

An essential object of the present invention is to provide a stable and compact matrix-type memory device capable of being inexpensively manufactured.

Said object and other objects of this invention have been attained by interweaving a group of warp conductors which consist of normal conductive wires and weft conductors consisting of the magnetic wires.

The present invention can be further improved by interposing spacer wires within the array of warp conductors and/or within the array of weft conductors. According to this improvement, the wires of the warp array are forcibly bent around the periphery of magnetic wires so as to hug them over an arc rather than lie tangentially to them to intensify the mutual action between the electric current and the ferro-magnetic film, to permanently maintain the said state, and to reduce the mechanical displacement and variation of the electrical characteristics of the memory matrix.

The nature, principle, and details of the invention will be best understood by reference to the following description when taken in connection with the accompanying drawings in which like parts are designated by like reference characters, and in which.

Figure 1:
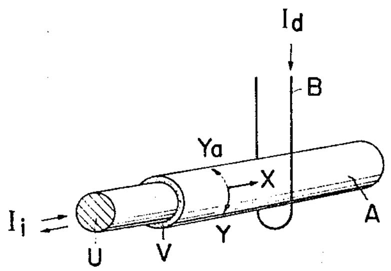
FIG. 1 is a perspective view showing the principle of a memory element, according to the invention, utilizing magnetic wires.

Referring to FIG. 1, a memory element according to the principles of the invention consists of a magnetic wire A and a conventionally conductive wire B, the magnetic wire being produced by coating a conductive core U composed diamagnetic or non-magnetic material such as copper, molybdenum, Invar or the like with a ferro-magnetic thin film V such as a permalloy layer by means of electrical or chemical plating or the vapor-deposition technique.

For the sake of simplifying the description, the operation will be described hereinafter in connection with the case in which the "easy" or optimum axis or direction of magnetization of the ferro-magnetic film most readily exploitable is directed toward the circumference of the wire A.

Figure 2:
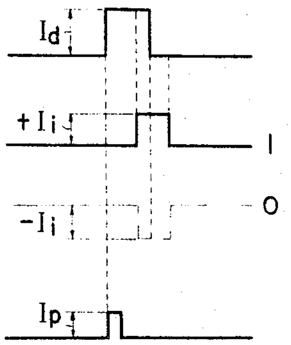
FIG. 2 is a diagram showing the states of the electric pulses supplied to and yielded by the memory element.

When an exciting pulse $I_d$ (FIG. 2) is passed through the wire B, the magnetization direction is changed from the direction Y to the direction X. Next, as shown in FIG. 2, an information pulse $I_i$ can be passed through the magnetic wire A during flow of the current $I_d$, and the magnetization direction is set or locked in either the direction Y or the direction Y*a* in accordance with the polarity (positive + or negative —) or direction of flow of the current $I_i$. In this case, when it is assumed that the set state corresponding to the direction Y and the set state corresponding to the direction Y*a* are, respectively, made to correspond to the information characters "1" and "0" of the digital system, it is possible to memorize or store the respective information units "1" or "0."

If the optimum axis of magnetization is directed longitudinally (i.e. lengthwise) of the magnetic wire, respective passing of the pulses $I_i$ ad $I_d$ through the wires B and A is necessary to record the desired memory state.

In the system of FIG. 1, since the direction of magnetization reverses upon the passing of the exciting pulse $I_d$, and an output pulse $I_p$ (referring to FIG. 2) of positive or negative polarity is produced in the output wire, reading-out of the memorized information can be effected by determining the polarity of the output pulse $I_p$. The output wire for reading-out the output pulse may be disposed in the vicinity of and parallel to the wire A or B so as to pass across the intersection of the latter conductors, which intersection corresponds to a magnetic core. Of course, the wire A or B may be commonly used as the output wire. Hereinafter, the description will be made in connection with the case in which the output wire is commonly used as one of the wires A or B, or disposed on one of the wires A or B itself. Furthermore, when the optimum axis of magnetization is oblique to the longitudinal dimension of the wire A, the same result can be obtained by making the wire B cross the wire A in the said oblique direction.

The optimum axis of magnetization can be selected in any direction depending upon the conditions adopted for manufacturing the ferro-magnetic coating film. For example, when an electric current is passed through the core wire during the plating process, the optimum magnetization axis will be produced in the circumferential direction.

Figure 3:
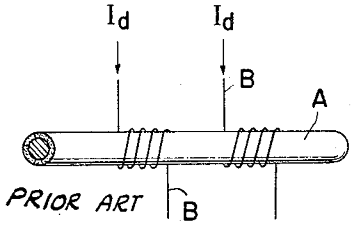
FIG. 3 is a perspective view of one embodiment of a conventional memory device utilizing magnetic wires.

A matrix-type memory device can be easily constructed in accordance with the above-mentioned principle by arranging a plurality or array of the parallel wires B so as to cross or intersect the array of magnetic wires A which are also arranged in parallel. However, according to this mere intersection of the arrays of wires A and B, only point contacts are established between the wires A and B and the output power is too weak to be used in practice. This disadvantage can be eliminated by winding several turns of the wire B around the wire A, as shown in FIG. 3, so as to increase the output power, but this conventional system is extremely disadvantageous from the mass-production and miniaturization points of view.

According to the present invention, the wires B are formed so as to be warp conductors of a first array, the magnetic wires A are formed so as to be weft conductors of a second array, and said warp and weft conductors are interwoven while interposing spacer wires between the said wires, maintaining the magnetic wires A as linear as possible, and bending only the conductors around the magnetic wires A, thus forming a closely woven fabric structure.

Figure 4:
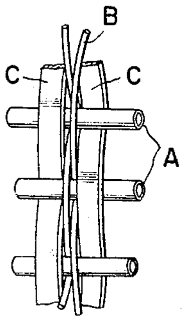
FIG. 4 to FIG. 9 are, respectively, enlarged fragment views of various different embodiments of the present invention.
Figure 5:
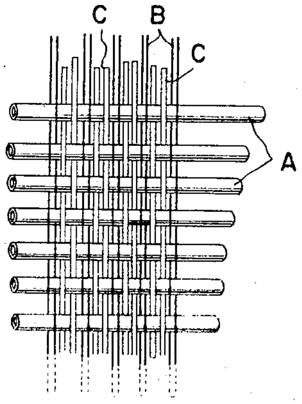

The embodiment shown in FIGS. 4 and 5 corresponds to the case in which an array of warp conductors consisting of the mutually parallel wires B and spacer wires C interposed between the wires B, and a group of weft conductors consisting of the plated wires A are woven so as to constitute fabric structure. In this embodiment, the wires B are grouped in pairs of two wires, and these two wires of each pair are, after weaving, connected at one side to one another in series as shown by dotted lines in FIG. 5, one of the wires of each group passing over and the other wire passing under each wire A, whereby a coil of one effective turn with respect to each of the magnetic wire A is formed by two warp wires of a pair. If four warp wires B are grouped and serially connected, after weaving, in the same manner as the case of FIG. 5, said four warp wires of a group effectively constitute a coil of two turns.

Figure 6:
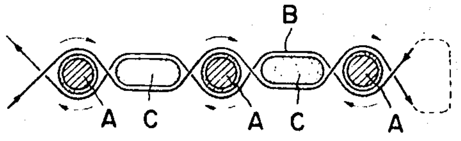
Figure 7:
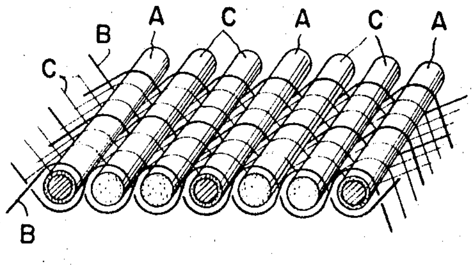

The embodiment shown in FIG. 6 rates to the case in which each of the spacer wires C is interposed between two adjacent magnetic wires A constituting weft conductors and the embodiment shown in FIG. 7 relates to the case in which two spacer wires C are interposed between two adjacent magnetic wires A and between two adjacent wires B.

When the magnetic wires A and the wires B are woven as in the cases of FIGS. 6 and 7, electric insulation of the wires A and B is necessary, so that either the wires A or B should be, of course, provided with electrically insulating coatings or films. Furthermore, the thickness, number, sectional shape, and material of the spacer wires C can be selected at will. Of course, the space between the adjacent bits or stored information can be determined at will depending upon the thickness and number of the spacers. However, it is preferable to use a thin, flexible and bendable material as the spacer wires of the warp conductors. On the other hand, the spacer wires of the weft are preferably made of wire material which is relatively thick and like the magnetic wires, is as inflexible as possible.

Figure 10:
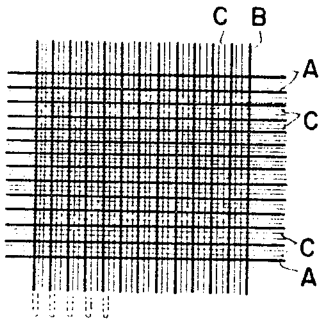
FIG. 10 is a plan view showing a woven memory device according to one embodiment of this invention.

In FIG. 10 is shown a woven fabric structure prepared by interposing spacer wires in both the warp conductor and the weft conductor arrays.

According to the above-mentioned memory elements, the following advantages are obtained.

(1) Since the magnetic wires A and the wires B can be woven by means of an automatic weaving machine as in the case of weaving fibrous cloth, mass-production of a matrix-type memory device having many bits is made possible.

(2) An extremely miniaturized memory device (for example, a device for 10,000 bits having dimensions of about 100 x 100 mm.) can be obtained by careful weaving of the wires.

Figure 11:
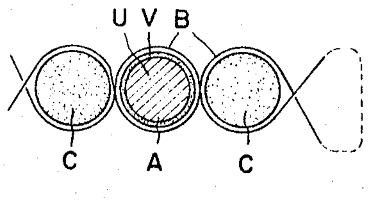
FIG. 11 is an enlarged cross-sectional view through the weft wires of an embodiment of this invention.

(3) When spacer wires C are interwoven into the weft arrays, a close weave can be attained in such a manner that air gaps are almost nonexistent in the woven fabric even if the distance between the adjacent magnetic wires is selected to suppress the interference or "cross-talk" between said wires. Accordingly, when as shown in FIG. 11, the going and returning wires B are forcibly bent around the circumference of the magnetic wires A so as to hug and surround substantial arc of the peripheries of the magnetic wires A, coils made to contact closely to the magnetic wires A, coils made to contact closely to the magnetic film V can be formed, whereby interference between the magnetic cores and occurrence of any noise is substantially reduced, and the output power is sharply increased.

(4) Since the weft and warp conductors are, respectively, mutually supported by the warp wires and weft wires, almost no air gaps are required between the wires, and the positions of all the wires are mutually and rigidly maintained, whereby variation of the characteristic of the product is eliminated.

(5) Furthermore, if the magnetic wires are used as the weft conductors, weaving can be carried out in such a manner that only the warp wires are bent without necessitating interposition of the magnetic wires, that is, while maintaining the magnetic wires in the linear states, having no distortion. Accordingly, the magnetic characteristics of the magnetic wires are not damaged even by mass-production. Furthermore, the spacer wires C used as the weft conductors participate in reinforcing the magnetic wires.

Figure 8:
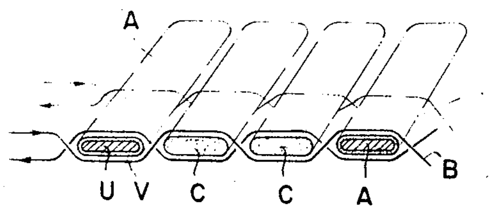
Figure 9:
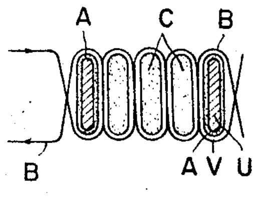

The embodiments shown in FIGS. 8 and 9 relate to cases in which a magnetic film V is applied as a coating on each flat core wire U, whereby flat plated wires are made.

According to such structures as described above, the contact areas, that is, the magnetic couplings between the magnetic wires A and wires B, are increased, thus further increasing the output power.

In embodying this invention, either one of the wires A and B may be flattened and the other may be of normal circular wire.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention as set forth in the appended claims.

What we claim and desire to be secured by Letters Patent is:

1. An information-storage matrix comprising, a woven structure of orthogonally intersecting arrays of warp and weft conductors, the weft conductors comprising a plurality of individual elongated, linear, stiff, non-magnetic conductors arranged in spaced parallel relationship, each of said non-magnetic conductors having a solid cross-section and a ferromagnetic information-retentive circumferential film extending axially along the length of the individual non-magnetic conductors without discontinuties, the warp conductors comprising a plurality of pairs of flexible conductors arranged in a woven relationship to said non-magnet conductors by the disposition of one flexible conductor of each pair of said flexible conductors in a first pass thereof around a first side of a first non-magnetic conductor then between said first non-magnetic conductor and a second non-magnetic conductor and around the opposite side of said second non-magnetic conductor, then between said second non-magnetic conductor and a third non-magnetic conductor, then around said first side of said third non-magnetic conductor and so on to the last of said non-magnetic conductors, the other flexible conductor of each of the pairs of flexible conductors being disposed on alternate sides of said non-magnetic conductors which are opposite to those sides embraced by said one of the flexible conductors of each given pair, whereby the flexible conductors of each of the pairs of flexible conductors jointly effectively define a single coil turn on each of the non-magnetic conductors associated with a respective bit-storage zone on the film on each of said non-magnetic conductors, a plurality of spacing elements disposed between adjacent pairs of said flexible conductors and parallel therewith, and said spacing elements being disposed alternately passing under and over the non-magnetic conductors and effective to cause each effective coil turn to lie close adjacent to said respective bit-storage zone.

2. An information-storage matrix comprising a woven structure of orthogonally intersecting arrays of warp and weft conductors, the weft conductors comprising a plurality of individual elongated, linear, stiff, non-magnetic conductors arranged in spaced parallel relationship, each of said non-magnetic conductors having a solid cross-section and a ferromagnetic information-retentive circumferential film extending axially along the length of the individual non-magnetic conductors without discontinuities, the left conductors comprising a plurality of pairs of flexible conductors arranged in a woven relationship to said non-magnetic conductors by the disposition of one flexible conductor of each pair of said flexible conductors in a first pass thereof around a first side of a first non-magnetic conductor then between said first non-magnetic conductor and a second non-magnetic conductor and around the opposite side of said second non-magnetic conductor, then between said second non-magnetic conductor and a third non-magnetic conductor, then around said first side of said third non-magnetic conductor and so on to the last of said non-magnetic conductors, the other flexible conductor of each of the pairs of flexible conductors being disposed on alternate sides of said non-magnetic conductors which are opposite to those sides embraced by said one of the flexible conductors of each given pair, whereby the flexible conductors of each of the pairs of flexible conductors jointly effectively define a single coil turn on each of the non-magnetic conductors associated with a respective bit-storage zone on the film on each of said non-magnetic conductors, each of said pairs of flexible conductors comprising two conductors in series in which said one conductor is a continuation of said other conductor, said conductor joining along a length thereof disposed completely around said last non-magnetic conductor so that said other conductor is a backward extension of said one conductor, a plurality of spacing elements disposed between adjacent pairs of said flexible conductors and parallel therewith, and said spacing elements being disposed alternately passing under and over the non-magnetic conductors.

3. An information-storage matrix according to claim 2, including a plurality of spacing elements disposed between adjacent non-magnetic conductors extending parallel with said non-magnetic conductors, each of said pairs of flexible conductors passing over and under the last-mentioned spacing elements whereby all of said conductors and all of said spacing elements define said woven structure, and said spacing elements being dimensioned to cause each effective coil turn to lie close adjacent to said respective bit storage zone and effectively substantially encircle said respective bit-storage zone.

4. In an information-storage matrix type memory having a woven structure obtained by interweaving closely warp-wires coresponding to drive-lines and weft-wires corresponding to information-lines while maintaining the weft-wires in the straight states, an improved combination of: information-lines comprising a plurality of individual elongated, linear, stiff, non-magnetic conductors arranged in spaced parallel relationship, each of said lines consisting of a thin conductor coated with a continuous circumferentially and longitudinally ferromagnetic thin film, an easy axis of magnetization of said line being directed in a peripheral direction of the conductor, drive-lines comprising a plurality of pairs of flexible conductors arranged in a woven relationship with said information-lines by the disposition of one flexible conductor of each pair of said flexible conductors in a first pass thereof around a first side of a first non-magneic conductor then between said first non-magnetic conductor and a second non-magnetic conductor, then between said second non-magnetic conductor and a third non-magnetic conductor, then around said first side of said third non-magnetic conductor and so on to the last of said non-magnetic conductors, the other flexible conductors of each of the pairs of flexible conductors being disposed on alternate sides of said non-magnetic conductor which are opposite to those sides embraced by said one of the flexible conductors of each given pair, flexible spacing elements interwoven as warp-elements between adjacent pairs of said flexible conductors and parallel therewith and disposed alternately passing under and over the non-magnetic conductors and effective to maintain the space between the adjacent drive lines at a certain distance, and means to pass a drive pulse through the drive line thereby to vary the magnetization direction of the information lines to a lengthwise direction from a peripheral direction.

5. An information-storage matrix type memory having a woven structure obtained by interweaving warp wires and left wires, wherein the weft wires are used as information wires, said information wires consisting of a plurality of individual elongated, linear, stiff conductors arranged in spaced parallel relationship, each of said information wires having a thin non-magnetic, conductive coating comprising a continuous ferromagnetic thin film circumferentially and longitudinally of each respective information wire, an easy axis of magnetization of each of said wires being directed in a peripheral direction; the warp wires being used as drive wires and comprising a plurality of pairs of flexible conductors arranged in a woven relationship with said information wires, one of each pair of said drive wires being disposed alternately passing under and over said information wires successively and so on to the last of said information wires and the other of each of the pairs of the drive wires being disposed on alternate sides of said information wires opposite to the sides of which said one of each pair of said drive wires is disposed; flexible spacer wires interwoven as warp wires between adjacent pairs of said flexible conductors and parallel therewith and disposed alternately passing under and over said information wires successively; means to apply drive pulses (I*d*) through the drive wires (B), thereby to vary the magnetization direction of the information wires (A) to a lengthwise direction (*x*) from a peripheral direction; means to apply information pulses (I*i*) representative of "1" or "0" through the information wires (A); and means for cutting off said drive pulses (I*d*) during passing of said information pulses (I*i*) and then cutting off said information pulses (I*i*), whereby the magnetization direction at the cross point of the individual information and drive wires to which said information and drive pulses are applied is written in an easy axis direction (Y) or (Y*a*), thus carrying out memorization of information.

References Cited

UNITED STATES PATENTS

| | | | |
|---|---|---|---|
| 3,221,312 | 11/1965 | MacLachlan | 340—174 |
| 3,377,581 | 4/1968 | Boles et al. | 340—174 |

BERNARD KONICK, *Primary Examiner.*

S. POKOTILOW, *Assistant Examiner.*